United States Patent
Kingsley

[11] Patent Number: 6,082,721
[45] Date of Patent: Jul. 4, 2000

[54] BUSHING

[76] Inventor: Richard J. Kingsley, 7707 NE. 144th Ave., Vancouver, Wash. 98682

[21] Appl. No.: 09/040,949

[22] Filed: Mar. 18, 1998

[51] Int. Cl.[7] .......................... B60G 11/18; B60G 11/22; F16B 35/00; F16B 37/16

[52] U.S. Cl. .......................... 267/276; 267/293; 411/359; 411/436

[58] Field of Search .................................... 267/276, 281, 267/141, 293, 149, 148; 16/2.1; 411/388, 389, 427, 436

[56] References Cited

U.S. PATENT DOCUMENTS

| | | | |
|---|---|---|---|
| 2,582,426 | 1/1952 | Greene | 267/281 |
| 4,488,736 | 12/1984 | Aubry et al. | 267/148 |
| 4,840,395 | 6/1989 | Sturmon | 280/688 |
| 4,922,573 | 5/1990 | Miller et al. | 16/2.1 |
| 4,966,386 | 10/1990 | Werdich | 267/276 |
| 5,820,115 | 10/1998 | Stevenson et al. | 267/293 |
| 5,902,050 | 5/1999 | Balczun et al. | 267/141 |

FOREIGN PATENT DOCUMENTS 361061834  3/1986  Japan .

OTHER PUBLICATIONS

One–page promotional brochure entitled "Dyco Industries Introduces a Unique Concept in Walking Beam Bushings" (1996).

One–page promotional material entitled "Dyco Industries Torque Arm Bushings will go the extra mile for you." Ball and Socket (1996).

Primary Examiner—Robert J. Oberleitner
Assistant Examiner—Bradley King

[57] ABSTRACT

A bushing having particularly advantageous use with heavy duty truck suspensions and including: i) a first outer bushing member; ii) a second inner bushing member defining an annular space between the first and second bushing members; and iii), an elastomeric interface disposed within the annular space between the first and second bushing members in face-to-face contact with; first and second sets of grooves formed in one of the first and second bushing members with the first set of grooves being axially spaced from the second set of grooves by a greater axial distance on one side of the grooved member than the axial spacing on the diametrically opposite side of the grooved member. In the exemplary bushings, first and second sets of grooves are formed on the inner surface of the first bushing member. The first and second sets of grooves may comprise helical threads of different hand, helical threads of different pitch, or discrete axially spaced grooves which may, but need not, be discrete continuous endless grooves. The inner and outer bushing members may be metal, or they may be a composite material including filament wound glass fibers and an epoxy resin, or the outer bushing member may be a composite material including filament wound glass fibers and an epoxy resin while the inner bushing member is metal. The inner bushing member may also be a compression molded composite material including glass fibers embedded in an epoxy resin. The elastomeric interface material is preferably urethane.

34 Claims, 7 Drawing Sheets

BUSHING

1. TECHNICAL FIELD

The present invention relates generally to bushings; and, more particularly, to a field wherein bushings of the present invention find particularly, but by no means exclusive, advantageous use—viz., the field relating to heavy duty truck suspensions such, for example, as walking beam end bushings, walking beam center bushings, torque arm bushings, and the like.

2. BACKGROUND ART

Bushings of the foregoing character have, as those skilled in the art will appreciate, been well known and in extensive use for a number of decades. Indeed, dating back to at least the 1950s, conventional prior art walking beam bushings have been in widespread use employing inner and outer coaxial steel sleeves and an elastomeric rubber interface. Similarly, torque arm bushings have been employed during essentially the same period of time utilizing an outer cylindrical steel sleeve, an inner solid pin, and an elastomeric rubber interface. In all of such conventional heavy duty truck bushings, the elastomeric interface is substantially pre-loaded—that is, the elastomeric rubber interface is formed within the outer steel sleeve and then an oversized inner steel bushing member is inserted using presses capable of exerting several tons of pressure to form a finished bushing in which the elastomeric rubber material is heavily pre-loaded and is urged into intimate face-to-face contact with both the inner and outer steel bushing members; and, wherein the elastomeric rubber material fills the multiplicity of depressions and imperfections in the surfaces of the inner and outer steel bushing members. Moreover, in some extremely heavy duty applications, the suspension manufacturer will employ bushings of the foregoing character wherein the inner and outer surfaces of respective ones of the outer and inner steel bushing members are coated with a chemical or adhesive bonding agent to promote adhesion of the elastomeric rubber material to the steel.

Heavy duty truck suspension bushings of the foregoing character are still the bushings of choice by most OEM truck suspension manufacturers today; and, they even are employed as replacement bushings in a significant portion of the bushing aftermarket. Unfortunately, however, such conventional prior art bushings have an extremely limited life, resulting in limited lifetime warrantees and the necessity to rebush the vehicle's suspensions frequently. Indeed, it is common to have to replace such conventional prior art bushings annually, if not more often.

Bushings of the foregoing character have also been used in automotive suspensions for passenger cars, light weight and intermediate weight trucks, recreational vehicles, off-road vehicles, and the like; but, the bushings have continued to exhibit the same limited lifetime characteristics resulting in the need to frequently rebush. This is, of course, particularly true when the vehicle is extensively used over rough terrain and/or with heavy loads.

As a consequence, in the mid to late 1970s and continuing into the 1980s, a number of companies involved in the automotive bushing aftermarket have introduced urethane bushing interfaces which can be employed with the original inner and outer metal bushing members in lieu of elastomeric rubber material. In such aftermarket usage, the elastomeric rubber interface is removed from the metal bushing parts, the metal bushing parts are typically cleaned, and the preformed urethane bushing inserts are then pressed into place between the inner and outer bushing members. In some instances, the urethane, rather than being preformed into discrete elastomeric bushing inserts, is cast in situ between the inner and outer bushing members. Such urethane aftermarket bushings have, in recent years, begun to capture a significant portion of the automotive aftermarket; but, they still have not found widespread acceptance by OEM's who continue to employ bushings with elastomeric rubber interfaces despite the fact that the life of bushings employing urethane interfaces is significantly extended.

In 1989 U.S. Pat. No. 4,840,395 issued to George Sturmon and such patent has been assigned to Atro Engineered Systems, Inc. of Cuba, Mo. (hereinafter the "Sturmon '395 patent"). The Sturmon '395 patent purports to disclose bushings suitable for use with heavy duty truck suspensions and employing: i) a cylindrical outer metal sleeve; ii) an inner bushing member coaxial with the outer sleeve and defining an annular space therebetween; and iii), a urethane interface cast in situ into the annular space between the inner and outer bushing members—i.e., the urethane interface is not pre-loaded. The Sturmon '395 patent further discloses use of a chemical or adhesive bonding agent which is applied to the inner surface of the outer cylindrical sleeve so that, when assembled and cured, the urethane interface is chemically or adhesively bonded to the outer cylindrical sleeve while it is fully rotatable with respect to the inner sleeve.

Dyco Industries, Inc., the assignee of the present invention, has, in the past, made both heavy duty truck suspension bushings and automotive bushings of the foregoing character which were either: i) unbonded except for the frictional bond resulting from the substantial pre-load applied to the urethane and wherein end caps were employed to fix the components axially; ii) where urethane was adhesively bonded to the outer sleeve; or iii), where no adhesive bonding agent was employed but, rather, the urethane was fixed to the outer sleeve by the significant pre-load applied to the urethane as a result of forcing a 0.080" oversized inner bushing member into the outer sleeve/urethane subassembly under several tons of pressure. The latter two types of Dyco bushings have employed a ball and socket arrangement wherein a spherical socket is formed in the inner surface of the urethane and a complemental spherical ball, slightly oversized with respect to the socket, is formed on the inner bushing member. In all of the foregoing Dyco bushings, the significant pre-load resulted from pressing an oversized inner bushing member into the urethane/sleeve combination under several tons of pressure, served to mechanically fix the urethane interface with respect to the outer bushing sleeve, while the ball and socket connection has served to axially fix the urethane interface with respect to the inner bushing member while permitting freedom of relative rotation therebetween.

Bushings of the type disclosed in the Sturmon '395 patent, as well as those heretofore manufactured and offered for sale by Dyco, have represented an improvement over conventional prior art bushings principally in terms of improved life expectancy attributable to the use of a urethane interface in lieu of the more conventional rubber interface; and, this has enabled the bushing manufacturers to offer extended warrantees of up to three years. However, while such bushings have made significant advances in the aftermarket, OEMs have continued to resist use of urethane bushings in original equipment. It is believed that such resistance to the use of urethane bushing interfaces by OEMs is, at least in part, attributable to experience demonstrating that the adhesive bond between the urethane and outer sleeve does fail, particularly under heavy usage. Somewhat improved results have been achieved where the urethane interface is significantly pre-loaded; and, this has been true irrespective of whether a chemical or adhesive bond has been employed between the urethane interface and the outer cylindrical sleeve.

Another serious problem with conventional bushings of the foregoing character resides in their weight. For example, a typical walking beam center bushing employing inner and outer cylindrical steel sleeves and an elastomeric interface will commonly weigh on the order of 23 pounds, although those skilled in the art will appreciate that such bushings can weigh considerably more. Thus, for certain military applications, such bushings have weighed up to 240 pounds. Similarly, a conventional walking beam end bushing will typically weigh 7 pounds, while a conventional torque arm bushing will commonly weigh on the order of about 4 pounds. Considering typical heavy duty truck suspensions, such suspensions will normally employ two (2) walking beams requiring two (2) center bushings (total bushing weight is approximately 46 pounds), four (4) end bushings (total weight is approximately 28 pounds), and anywhere from four (4) to ten (10) torque arm bushings (total weight ranging from about 16 pounds to about 40 pounds). Thus, the total weight of simply the bushings in a heavy duty truck suspension will be, on average, somewhere between 90 pounds and 114 pounds. And, of course, it is known that every pound required in the vehicle suspension system results in one less pound in the vehicle's load carrying capacity. Since it follows that for every pound that can be eliminated from the truck suspension, the load can be increased by a pound for every trip, it is extremely important to the OEMs to find ways that the weight of the truck's suspension can be reduced, thereby increasing load carrying capacity. Yet, notwithstanding the foregoing, for a half century or more, there has been no significant weight reduction in truck suspension bushings.

SUMMARY OF THE INVENTION

Accordingly, it is one general aim of the present invention to provide bushings of the foregoing character employing a urethane interface wherein the urethane is mechanically locked to one of the outer and inner bushing members, thereby positively and permanently precluding relative axial and/or relative rotational movement therebetween; and, wherein the other of the outer and inner bushing members is axially fixed relative to the urethane interface but freely rotatable with respect thereto and, therefore, with respect to the bushing member to which the urethane is mechanically and permanently locked.

In another of its important aspects, it is an object of the invention to provide heavy duty truck suspension bushings which weigh, on average, from only about 33% to about 36% of the weight of a conventional bushing and, in some cases, only from about 30% to about 33% of the weight of conventional bushings. As a result of attaining this objective, a typical heavy duty truck suspension including two (2) walking beams and four (4) torque arm bushings can have the total weight of the bushings reduced from, for example, about 90 pounds to about 71 pounds (assuming replacement of only the outer bushing member with light-weight materials and only four torque arm bushings); or, a net saving of 19 pounds permitting increase of the vehicle's load-bearing capacity by 19 pounds per trip. Assuming ten (10) torque arm bushings and replacement of both the outer bushing member and the inner bushing member with light-weight materials, the weight of the bushings used in a typical heavy duty truck suspension system can be reduced from about 114 pounds to as little as about 49 pounds, or a net reduction in the weight of bushings used in the vehicle's suspension system of up to 65 pounds, allowing an increase in load-bearing capacity of 65 pounds per trip.

The foregoing weight savings are achieved in the practice of the present invention by utilizing composite materials including filament wound glass fibers and an epoxy resin and/or compression molded glass fiber filaments embedded in an epoxy resin in lieu of steel, yet wherein the load-bearing capacity and life expectancy of the composite bushing is equal to, if not better than, the load-bearing capacities and life expectancies of conventional all steel bushings using an elastomeric rubber interface.

Another and more detailed objective of the present invention is to provide a positive and permanent mechanical lock between the urethane interface of the bushing and one of the inner and outer bushing members—preferably the outer bushing member—by forming first and second sets of generally transverse, axially spaced, grooves in the selected bushing member wherein the grooves lie in planes transverse to the axis of the bushing other than a transverse plane normal to the bushing's axis, and wherein the axial distance between common points on a groove in each set of grooves is greater than the axial distance between those grooves on the diametrically opposite side of the bushing—that is, the first set of transverse grooves is at a different angle with respect to the axis of the bushing than is the second set of grooves.

More specifically, it is an object of the invention -to provide a permanent mechanical locking system for positively locking a urethane interface to one of the inner and outer bushing members wherein the first and second sets of axially spaced grooves respectively comprise left hand and right hand threads or, alternatively, wherein the pitch of the first set of threads is different than the pitch of the second set of threads.

A related object of the invention is to provide a ball and socket joint between the urethane interface and the other of the inner and outer bushing members—i.e., the bushing member which is not permanently mechanically locked to the urethane interface—thus ensuring that the urethane interface and bushing member mechanically locked thereto are axially and rotationally locked in place with respect to one another while the urethane interface and the other of the bushing members are axially locked in place with freedom for relative rotation and/or conical movement therebetween.

A more specific object of the invention is the provision of an effective permanent mechanical locking system for locking a bushing's elastomeric interface to one of the inner and outer bushing members, thereby eliminating the need perceived by some persons skilled in the art to employ chemical and/or adhesive bonding agents and thus eliminating environmental hazards resulting from usage of such materials in the workplace.

Still another important objective of the present invention is to provide a mechanical locking system for bushing components wherein the face-to-face surfaces of the locked components are substantially greater in area than the area of corresponding smooth ungrooved surfaces and wherein such substantially increased surface areas serve to contribute to the structure's relative permanent immovable characteristics with respect to the locked bushing components.

DESCRIPTION OF THE DRAWINGS

These and other objects and advantages of the present invention will become more readily apparent upon reading the following Detailed Description and upon reference to the attached drawings in which.

Figure 1:
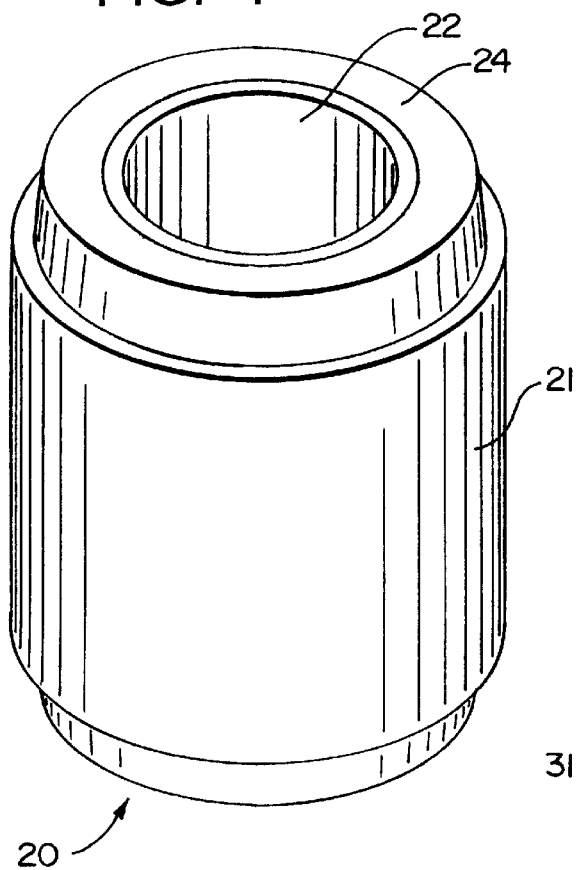
FIG. 1 is an isometric view of a walking beam bushing of the type used in heavy duty truck suspensions and the like, here embodying features of the present invention.

While the present invention is susceptible of various modifications and alternative forms, specific embodiments thereof have been shown by way of example in the drawings and will herein be described in detail. It should be understood, however, that it is not intended to limit the invention to the particular forms of the invention disclosed; but, on the contrary, the intention is to cover all modifications, structural equivalents, equivalent structures, and/or alternatives falling within the spirit and scope of the invention as expressed in the appended claims. Thus, in the appended claims, means-plus-function clauses and similar clauses are intended to cover: i) the structures described herein as performing a specific recited function; ii) structural equivalents thereof; and iii), equivalent structures thereto. For example, although a nail and a screw may not be deemed to be structural equivalents since a nail employs a cylindrical surface to secure wooden parts together while a screw employs a helical surface, in the art broadly pertaining to the fastening of wooden parts, a nail and a screw should be deemed to be equivalent structures since each perform the recited fastening function.

DETAILED DESCRIPTION

Figure 2:
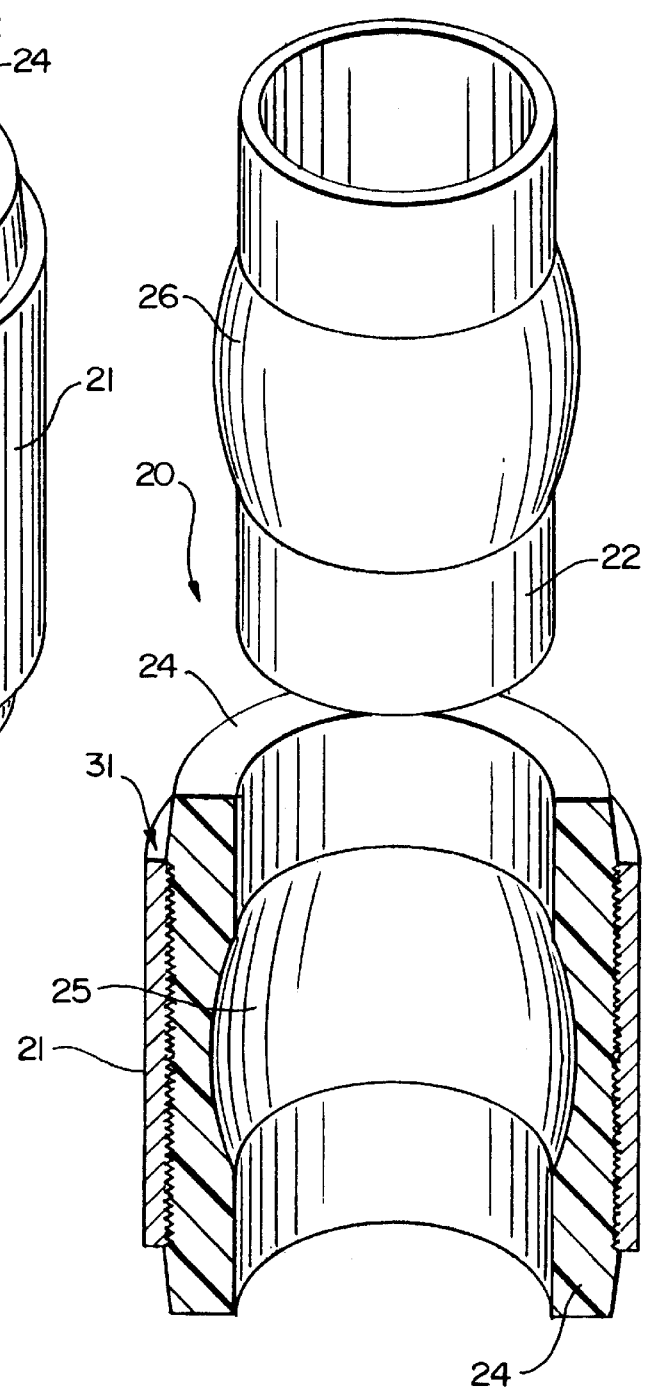
FIG. 2 is a partially exploded isometric view of the walking beam bushing depicted in FIG. 1, here illustrating the outer cylindrical sleeve and the urethane interface in section and illustrating particularly the interface therebetween which has been made in accordance with the present invention.

Turning now to the drawings, and directing attention first to FIGS. 1 and 2 conjointly, an exemplary walking beam bushing embodying features of the present invention has been shown and is generally indicated at 20. As here shown, the bushing 20 includes: i) a cylindrical outer sleeve or bushing member 21; ii) a generally cylindrical inner sleeve or bushing member 22 coaxial with, and spaced from, the outer bushing member 21; and iii), an annular elastomeric interface 24. As the ensuing description proceeds, it will become apparent to persons skilled in the art that the foregoing bushing components can be made from a wide range of materials; but, in the exemplary form of the invention depicted in FIGS. 1 through 5, the cylindrical outer sleeve of bushing member 21 and the inner cylindrical sleeve of bushing member 22 are formed of any suitable metal such, for example, as steel; while the annular elastomeric interface is formed of a polyurethane or a urethane material preferably having a hardness of about 85–95 Shore A but in the range from about 85 Shore A to about 50 Shore D.

In carrying out the present invention, the annular elastomeric interface 24 is formed with a centrally located spherical socket 25, while the inner bushing member 22 of the exemplary bushing 20 is formed with a centrally located complemental spherical ball 26. The spherical ball 26 may be of metal or may be formed by molding the spherical ball 26 on the cylindrical inner bushing member 22 using any suitable synthetic materials such, for example, as urethane preferably having a hardness in the range of from about 85 Shore A to about 50 Shore D. In either case, the outside diameters of the inner bushing member 22 and its integral spherical ball 26 are preferably oversized with respect to the inside diameters of the annular elastomeric interface 24 and its central spherical socket 25—for example, approximately 0.080" larger. As a consequence, when the bushing 20 is assembled by forcing the oversized inner bushing member 22 and its integral ball 26 into the preassembled outer cylindrical sleeve/elastomeric interface combination 21/24 using a press (not shown) capable of exerting pressures of up to about eight tons/in$^2$ (the actual pressure required will vary and will be a function of the size of the bushing 20, the nature of the elastomeric material, and the degree of oversizing of the inner bushing member and its integral ball). This serves to significantly pre-load the elastomeric interface 24 which, as indicated in FIG. 1, is located intermediate the cylindrical outer and inner bushing members 21, 22, respectively, thus creating a form of mechanical bond between the outer surface of the annular elastomeric interface 24 and the inner surface of the outer cylindrical bushing member 21, particularly in those instances where the inner surface of the bushing member 21 has been cleaned and coated with a phosphate material or has been sandblasted.

It has been found that in bushings 20 assembled in the foregoing manner, a mechanical bond is established between the elastomeric interface 24 and the outer bushing member 21 which is at least as effective as a chemical or adhesive bond in bushings where no significant pre-load exists. Such mechanical bond serves to prevent relative axial and relative rotational movement between the outer bushing member 21 and the elastomeric interface 24, while the inner bushing member 22 is free to rotate and/or move conically within the elastomeric interface 24 although the ball and socket joint 26/25 serves to preclude axial movement of the inner bushing member 22 relative to the outer bushing member/ elastomeric interface combination 21/24.

Unfortunately, however, bushings as thus far described—whether pre-loaded and/or employing chemical or adhesive bonds—tend to have limited life expectancies (although a substantially greater life expectancy where the elastomeric material is urethane rather than where it is rubber), particularly when subjected to heavy loads and rough terrain. Failure of such bushings typically is exemplified by rupture of the bond—whether mechanical, chemical or adhesive—between the elastomeric interface 24 and the outer bushing member 21, thus permitting freedom of relative rotational movement and/or relative axial movement between the outer bushing member 21 and the elastomeric interface. In short, when such failures occur, the bushing must be replaced.

Figure 3:
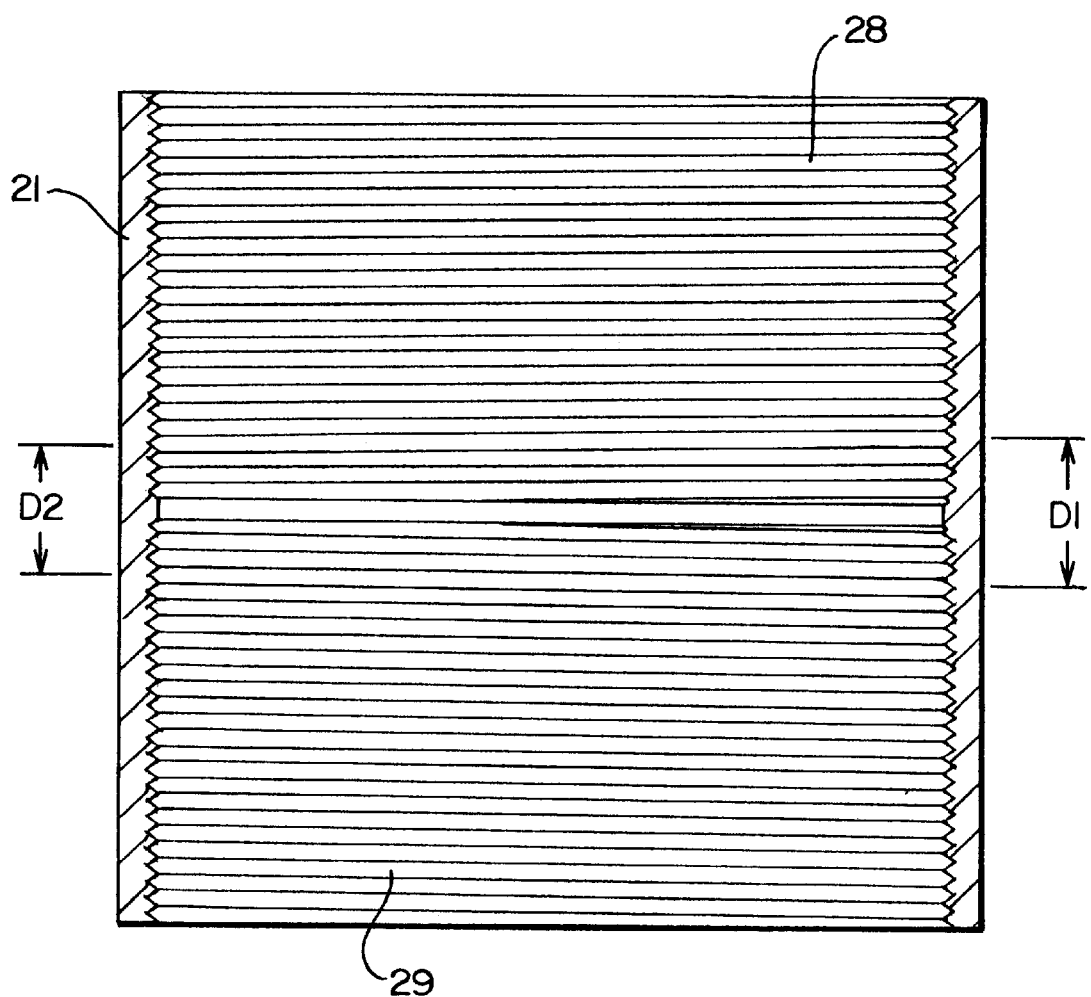
FIG. 3 is a sectional view of the outer cylindrical sleeve of the bushing depicted in FIGS. 1 and 2, here illustrating one embodiment of the invention wherein the sleeve is internally threaded in opposite directions—i.e., a right-hand thread and a left-hand thread—at its opposite extremities.

In order to resolve the foregoing disadvantages inherent in prior art bushing constructions, and in accordance with one of the important aspects of the present invention, provision is made for establishing a positive, permanent mechanical lock between the elastomeric interface 24 of the bushing 20 and a selected one of the outer and inner bushing members 21, 22. In the exemplary form of the invention depicted in FIGS. 1 through 5, this is accomplished by forming first and second axially spaced sets of grooves 28, 29, respectively, in the inner cylindrical surface 30 of the outer cylindrical bushing member 21 as best shown in FIG. 3. However, as the ensuing description proceeds, it will become apparent to persons skilled in the art that the sets of grooves 28, 29 need not be formed in the inner surface 30 of the outer bushing member 21, but, rather, they could be formed in the outer surface of the inner bushing member 22 (not shown), in which event the permanent mechanical lock would be established between the elastomeric interface 24 and the inner bushing member 22 rather than between the elastomeric interface 24 and the outer bushing member 21 as shown in the drawings.

In carrying out one form of the present invention, the first and second set of grooves comprise helical female threads, generally indicated at 31, wherein one set of threads—for example, the set 28—may comprise right hand threads and the other set 27 may comprise left hand threads. Thus, it will be seen upon inspection of FIG. 3 that the threads in each of sets 28, 29 lie in essentially parallel planes and, since the threads 28 are of opposite hand with respect to the threads 29, the distance D1 (FIG. 3) between comparable threads in the sets 28, 29 is greater than the distance D2 between those same comparable threads on the diametrically opposite side of the cylindrical outer bushing member 21.

Figure 4A:
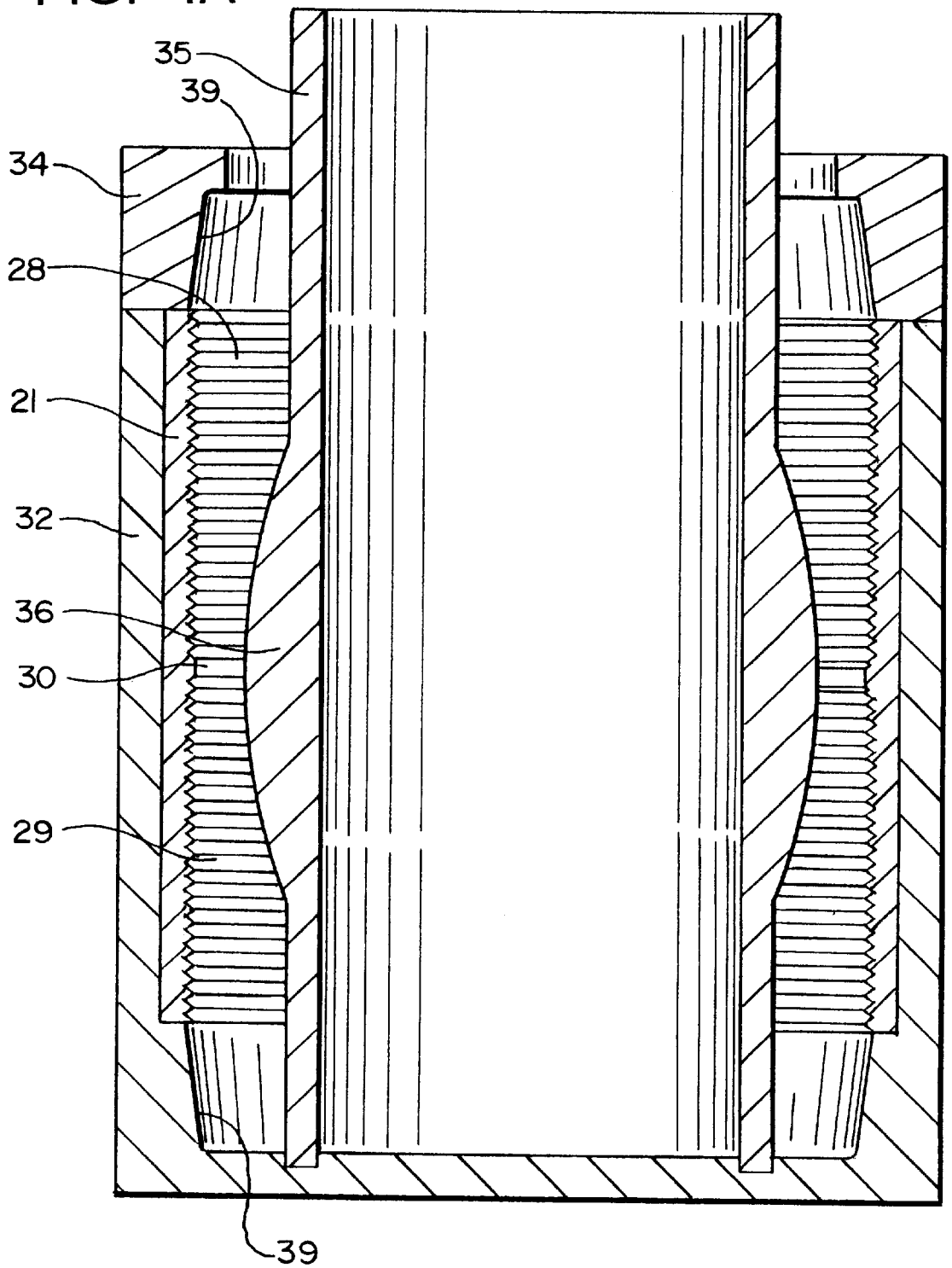
FIG. 4A is a vertical sectional view here illustrating the outer cylindrical sleeve of the bushing shown in FIGS. 1 and 2 positioned within a pocket-type mold having an internal removable mandrel positioned coaxially within the mold and outer sleeve.
Figure 4B:
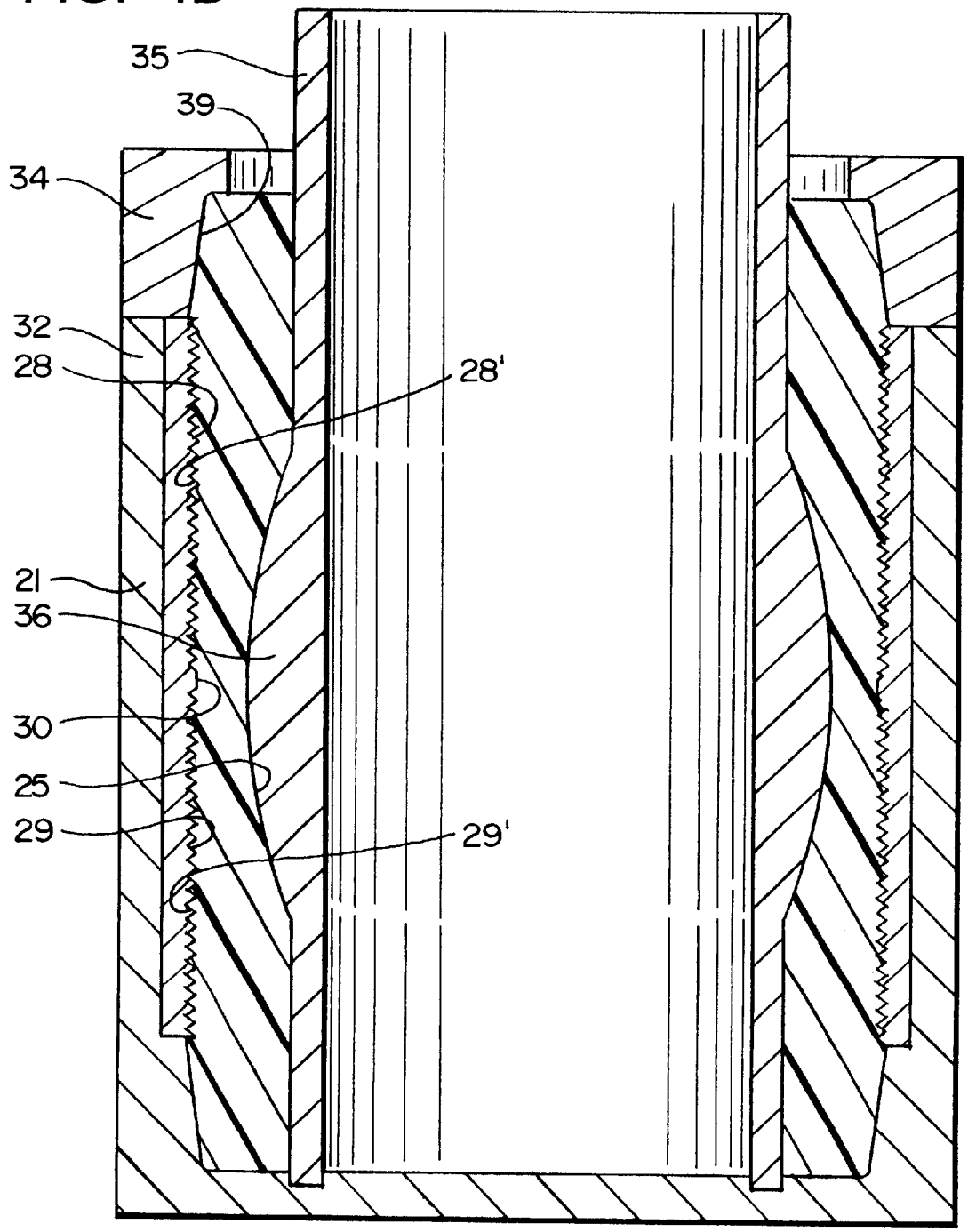
FIG 4B is a vertical sectional view similar to FIG. 4A, but here illustrating the components after the urethane interface has been poured or cast in situ between the outer cylindrical sleeve and the removable mandrel.
Figure 5:
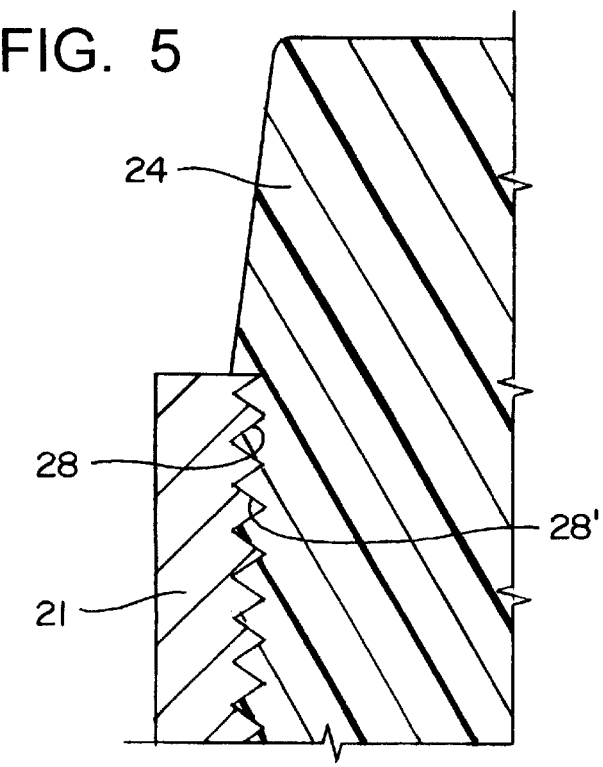
FIG. 5 is an enlarged sectional view here illustrating details of the interface between the urethane and one internally threaded end of the outer cylindrical sleeve.

In keeping with the invention, and as best depicted in FIG. 4A, the thus internally grooved outer cylindrical bushing member 21 is positioned within a cylindrical pocket mold 32 having a removable mold cover 34. A cylindrical mandrel 35 having a spherical ball 36 formed centrally thereof is then positioned within the mold 32 in coaxial relation to the outer bushing member 21. At this point, and as best observed by reference to FIG. 4B, a castable liquid polyurethane material is poured into the annular space between the mandrel 35 and the outer cylindrical surface defined by the bottom sidewall 38 of the mold, the threaded inner surface 30 of the outer bushing member 21, and the inner sidewall 39 of the mold cover 34, with the liquid polyurethane material substantially completely filling the female threaded portions 28, 29 in the outer bushing member 21. Upon setting and curing, the polyurethane forms the annular elastomeric interface 24 of the bushing with the interface 24 having internal male right hand and left hand sets of threads 28', 29' in meshed engagement with respective ones of the female sets of threads 28, 29 formed on the inner surface 30 of the outer bushing member 21.

After setting and at least partial curing, the mold cover 34 is removed from the mold 32. The subassembly comprising the outer bushing member 21 and the elastomeric interface 24, together with the mandrel 35, are then also removed from the mold 32, placed in a suitable jig (not shown), and the mandrel 35 is pressed out of the subassembly 21/24 using a press (not shown) capable of exerting a substantial tonnage of pressure (generally in the range of about 1–2 tons/in$^2$, or more) sufficient to enable expulsion of the mandrel 35 from the subassembly 21/24. Thereafter, the inner bushing member 22 (FIG. 2), which has outer diameters for the cylindrical and spherical portions 22, 26 of the inner bushing member approximately 0.080" greater than the corresponding dimensions of the mandrel 35—and, therefore, greater than the corresponding inside diameters of the molded elastomeric interface 24—is forced into the outer bushing member/elastomeric interface subassembly 21/24 by any suitable press (not shown) capable of exerting pressures of up to about 8 tons/in$^2$ to form the finished bushing 20 shown in FIG. 1.

Thus, the arrangement is such that the elastomeric interface 24 is positively and permanently mechanically locked to the outer bushing member 21 by the threaded interface 31, while it is precluded from relative axial movement with respect to the inner bushing member 22 by the ball and socket joint 26/25 which, nevertheless, permits relative rotational and/or conical movement between the elastomeric interface 24 and the inner bushing member 22.

Typically in the manufacturing process, the internally threaded outer bushing member 21 will be treated to clean the surface of the steel and protect against corrosion and/or rust formation. Such treatment may include sandblasting and/or cleaning in a conventional caustic aqueous cleaner, rinsing, immersion in a muriatic acid pickling or activating solution to remove scale, rinsing, and immersion in a suitable phosphating solution—for example, a heavy zinc phosphate which may deposit 1,600 mg of material per square foot. In either case, the inner surface 30 of the outer bushing member 21 is not only cleaned and rust-proofed but, in addition, the surface 30 of the bushing member 21 is conditioned to form a mechanical bond with the elastomeric interface 24, which mechanical bond is separate from, and in addition to, the permanent mechanical locking feature established by the meshed sets of threads 28/28' and 29/29'.

Those skilled in the art will appreciate from the foregoing description that the permanent mechanical locking system described above and attributable to the meshed threads 28/28' and 29/29' will, because of the opposite hands of the thread sets 28/28', 29/29' absolutely and permanently resist unthreading of the elastomeric interface 24 from the outer bushing member 21 because any attempt to unthread the meshed right hand threads 28/28' would be resisted and precluded by the meshed left hand threads 29/29'. And, the same is true if rotational force is applied in an attempt to unthread the meshed left hand threads 29/29'. In short, the difference in the threads 28/28', 29/29' is such that relative rotational movement and relative axial movement is absolutely and permanently precluded.

Indeed, those skilled in the art will appreciate that the same result can be achieved by the use of two (2) sets of right hand threads and/or two (2) sets of left hand threads (not shown), provided only that the pitch of one set of the threads is different from the pitch of the other set of threads. Moreover, the unthreaded central portion 30 of the inner surface of the outer bushing member 21 provides a further mechanical block which prevents axial passage of the male threads 28', 29' and, therefore, which prevents relative rotational and/or relative axial movement between the elastomeric interface 24 and the outer bushing member 21. Those skilled in the art with further appreciate that while the exemplary form of the invention depicted in FIGS. 1 through 5 contemplates formation of threads 28, 29 on the inner surface 30 of the outer bushing member 21 extending from the opposite axial ends of the bushing member 21 and terminating just short of the midpoint of the cylinder, it is also within the scope of the invention to form threads extending axially only partway into the cylinder 21—for example, one-quarter, one-third, etc. of the axial length of the cylinder 21—or, alternatively, the threaded portions 28, 29 can meet at any desired common transverse plane extending through the cylinder 21.

The arrangement is such that the likelihood of failure of the mechanical bond between the elastomeric interface 24 and the outer bushing member 21 due to extensive, and even excessive, use under adverse conditions is substantially eliminated. Even if there should be such a failure, the intermeshed threads 28/28', 29/29' will still positively preclude relative axial and relative rotational movement between the outer bushing member 21 and the elastomeric interface 24. Moreover, the very fact of providing threads or other suitable intermeshed grooves at the interface between the elastomeric interface 24 and the outer bushing member 21 serves to substantially increase the face-to-face surface areas over which any mechanical bond and the permanent mechanical locking feature of the present invention is effective, thereby further contributing to the solidity and permanence of the mechanical lock.

Figure 7:
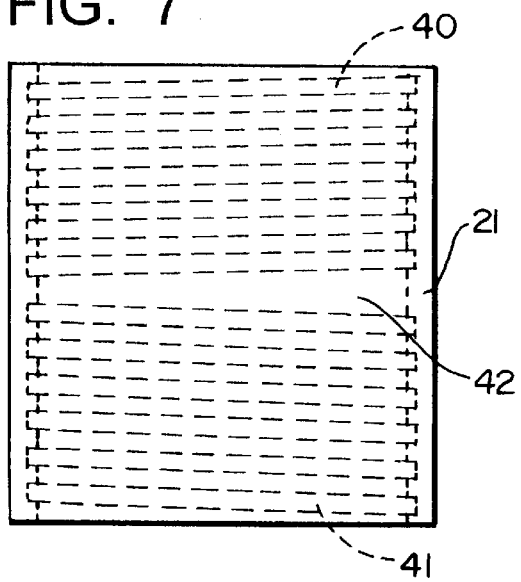
FIG. 7 is an elevational view of a slightly modified outer cylindrical sleeve, which can be formed of either metal or composite material, and wherein the internal threads have been replaced by axially spaced adjacent grooves lying in transverse planes which intersect the axis of the sleeve at acute angles.
Figure 8:
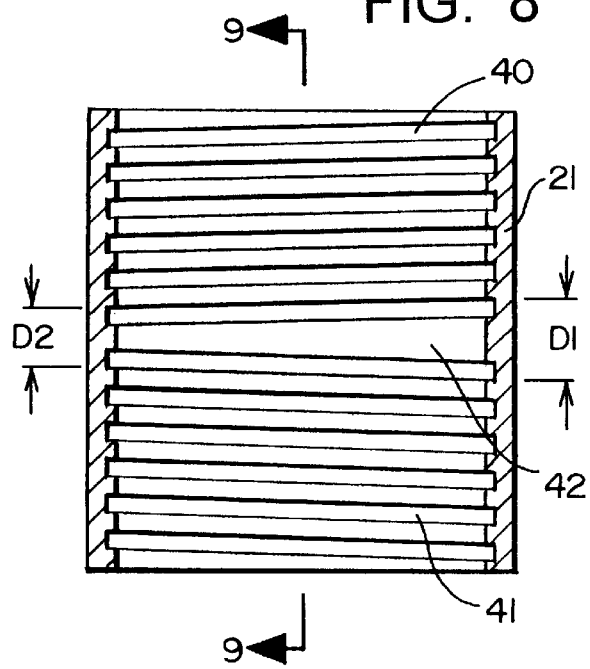
FIG. 8 is a sectional view of the modified form of the invent on depicted in FIG. 7, here taken substantially along the line 8—8 in FIG. 9.
Figure 9:
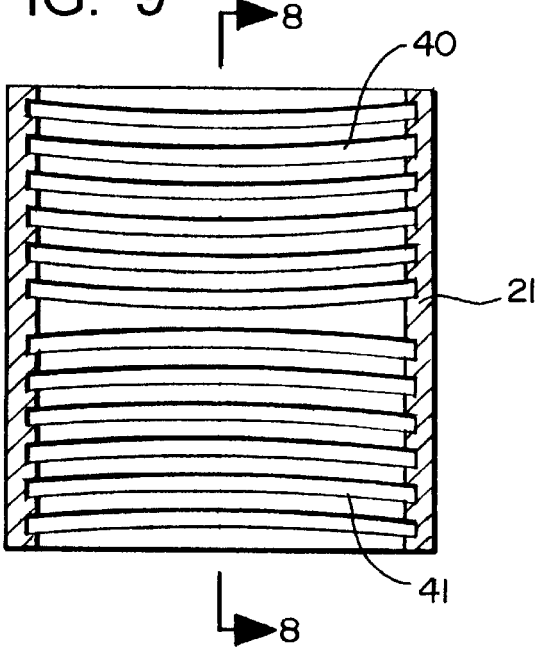
FIG. 9 is a sectional view of the modified form of the invention shown in FIG. 7, here taken substantially along the line 9—9 in FIG. 8; and, FIG. 10 is an isometric view, partially in section, here illustrating the invention as incorporated in a torque arm bushing wherein the outer cylindrical metal sleeve and the inner pin have been shown as formed of suitable glass filaments or fibers and an epoxy resin or similar composite material, yet wherein the inner and outer bushing members can be formed of metal (not shown).

Turning next to FIGS. 7, 8 and 9, yet another modified embodiment of the invention has been illustrated. As here shown, the outer cylindrical bushing member 21 is provided with two (2) sets of axially spaced, discrete grooves 40, 41 wherein the grooves 40 of one set lie in transverse, parallel, axially spaced planes in the upper portion of the cylindrical bushing member 21 as viewed in FIGS. 7 and 8, while the grooves 41 of the second set lie in transverse, axially spaced, parallel planes in the lower portion of the bushing member. In keeping with the invention, it will be observed upon inspection of FIGS. 7 and 8 that the grooves 40, while parallel to one another, are not parallel to the grooves 41. That is, the axial distance D1 between comparable grooves 40, 41 in both sets is substantially greater than the axial distance D2 between those same two grooves 40, 41 on the diametrically opposite side of the cylindrical bushing member 21 while the central inner cylindrical surface 42 of the bushing member 21 remains ungrooved.

Thus, it will be apparent that when liquid elastomeric material is cast in place between a mandrel (not shown, but similar to the mandrel 35 in FIGS. 4A, 4B) and the grooved bushing member 21, the elastomeric material will completely fill the grooves. Consequently, when set and cured, the elastomeric interface (not shown in FIGS. 7 through 9, but identical to the interface 24 in FIGS. 1, 2 and 4A–5 except for the shape of the molded grooves and ribs in the elastomeric material) will be fixed and permanently locked in place with respect to the outer bushing member 21.

Those skilled in the art will appreciate that while the grooves 40, 41 have, in the exemplary embodiment of FIGS. 7 through 9, been shown as discrete, continuous and endless grooves, they need not be continuous, endless grooves. Rather, they can circumscribe only a portion of the inner peripheral surface 42 of the outer bushing member 21.

Figure 10:
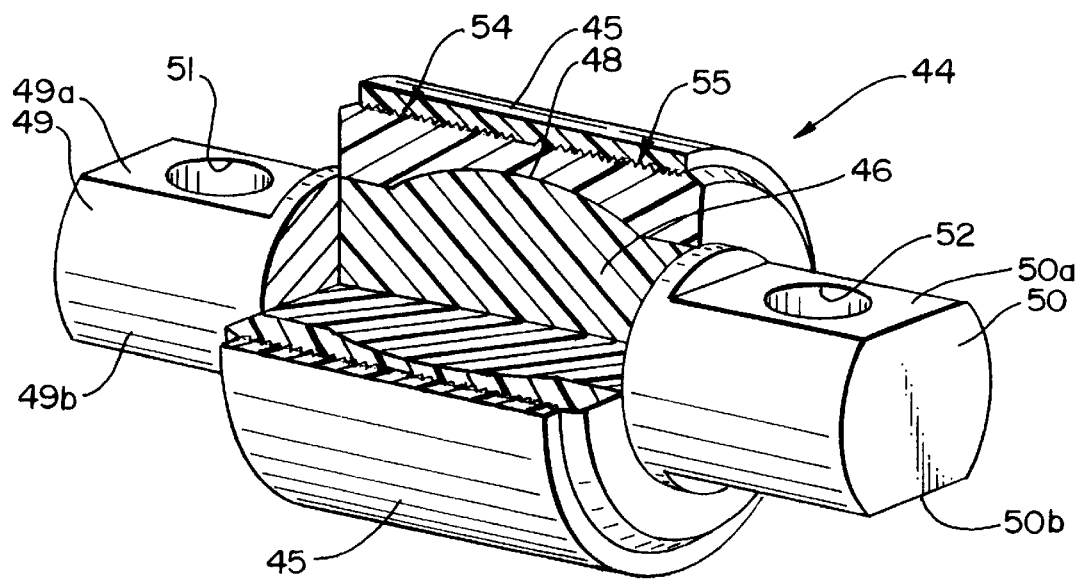

Referring next to FIG. 10, it will be observed that the foregoing permanent mechanical locking feature described above in connection with walking beam bushings 20 of the type shown in FIG. 1 is equally applicable for use with a typical torque arm bushing of the type generally indicated at 44. Thus, as here shown, the exemplary torque arm bushing 44 includes an internally threaded outer cylindrical bushing member 45, an inner bushing member 46 comprising a generally rounded or cylindrical pin formed of solid bar stock and having: i) an integral spherical ball 48; and ii), a pair of axially projecting end portions 49, 50 having diametrically opposed flatted surfaces 49a, 49b and 50a, 50b with through bores 51, 52. The manner of construction and assembly of the walking beam bushing 20 (FIG. 1) and the torque arm bushing 44 (FIG. 10) is identical; and, the only difference is that the walking beam bushing 20 (FIG. 1) includes a cylindrical inner bushing member 21, while the torque arm bushing 44 (FIG. 10) includes a solid pin-like bushing member 49. As with the walking beam bushings 20 previously described, the first and second sets of grooves, generally indicated at 54, 55 in FIG. 10, can be left and right hand threads, threads of different pitch, or discrete grooves such as shown and described in connection with FIGS. 7 through 9.

Moreover, persons skilled in the art will also appreciate that the positive permanent mechanical locking feature described hereinabove as existing between the elastomeric interface 24 and the outer bushing member 21, 45 can, if desired, be employed to positively and permanently lock the elastomeric interface 24 to the inner bushing member 22, 46 (not shown). In this event, the inner bushing member 22, 46 will be cylindrical (in walking beam bushings), or of solid, rounded rod-like structure (in torque arm bushings), and will be devoid of an integral ball and have first and second sets of grooves formed therein (not shown); while the outer bushing member 21, 45 will be cylindrical and have an integral, inwardly extending, spherical ball cooperable with a spherical socket formed in the outer surface of the elastomeric interface 24 (not shown). Other than these structural differences, the structure and function of the bushings will be identical to those previously described except that the elastomeric interface 24 will be permanently locked to the inner bushing member 22, 46, thereby precluding relative rotational and/or axial movement therebetween, while the ball and socket joint between the elastomeric interface and the outer bushing member 21, 45 will accommodate requisite rotational and/or conical movement therebetween while preventing axial movement.

As thus far described, the bushings of the present invention have been made of relatively conventional materials—viz., steel for the inner and outer bushing members 21/22, 45/46 and of polyurethane or the like for the elastomeric interface 24. Unfortunately, however, such conventional bushings have a serious and inherent defect of long standing-indeed, the defect has been present from the inception of this type of bushing more than four decades ago. Thus, the bushings suffer from the fact that they are extremely heavy attributable to the use of steel; and, since a typical heavy duty truck suspension will commonly have: i) two (2) walking beam center bushings (each weighing about 23 pounds); ii) four (4) walking beam end bushings (each weighing about 10 pounds); and iii), from four (4) to ten (10) torque arm bushings (each weighing on the order of about four pounds), it can be seen that the total bushing weight in the truck's suspension can amount to from about 90 pounds to about 114 pounds, or more. Every pound of weight included in the truck's suspension reduces the load carrying capacity of the truck by one pound. Therefore, there has been a long felt need to reduce the weight of truck suspensions and thereby increase the truck's load carrying capacity on a pound-for-pound basis. Efforts have, in the past, been made to reduce the weight of truck suspensions so as to increase the load carrying capacity; but, prior to the advent of the present invention, the present inventor knows of no efforts in the prior art, successful or otherwise, to reduce the weight of a truck's suspension bushings which must, of course, be capable of absorbing tremendous punishment in normal use.

Figure 6:
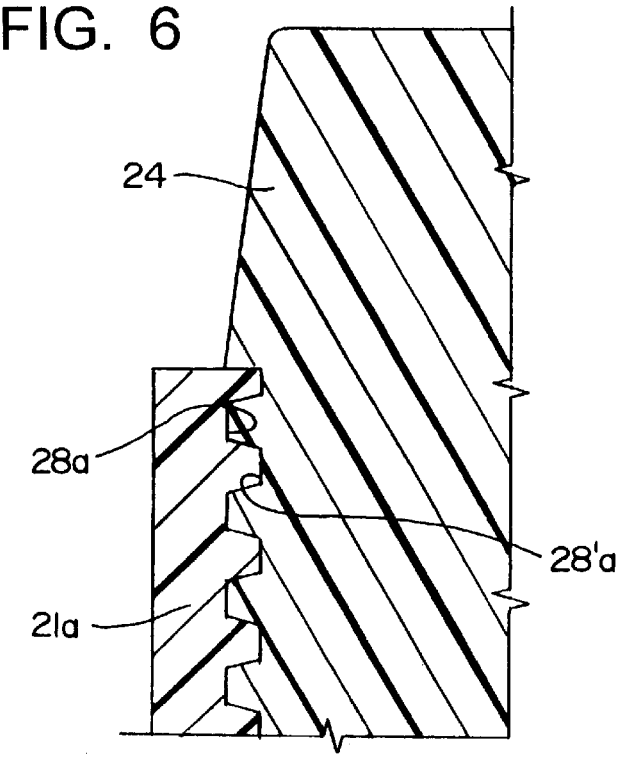
FIG. 6 is an enlarged vertical sectional view similar to FIG. 5, but here illustrating a modified form of the invention wherein the outer cylindrical sleeve is formed of a composite filament wound glass fiber and an epoxy resin material and wherein the internal grooves have a slightly different configuration than depicted in FIG. 5.

Accordingly, it is another of the important objectives of the present invention to substantially reduce the weight of heavy duty truck suspension bushings and, therefore, at the same time substantially increase a truck's load carrying capacity. To accomplish this, and as best shown in FIG. 6, the outer cylindrical bushing member 21a is formed of filament wound glass fibers and a suitable epoxy resin. Female threads or grooves 28a are formed in the outer bushing member 21a and are in meshed, permanently locked, engagement with complementary male threads or grooves 28a in the elastomeric interface 24, all as previously described. Replacement of simply a conventional steel cylindrical outer bushing member 21 with a bushing member 21a formed of a filament wound glass fiber/epoxy resin composite material serves to reduce the weight of a typical walking beam center bushing from about 23 pounds to only about 10 pounds—i.e., a net decrease of 13 pounds per walking beam, or 26 pounds per truck suspension. Replacement of the inner cylindrical steel bushing member 22 of a walking beam center bushing (FIGS. 1 and 2) with such a composite material serves to further reduce the weight of the bushing to only about 7 pounds, or a net decrease of an additional 6 pounds per truck suspension. Similarly, a typical all steel walking beam end bushing will normally weigh about 7 pounds; but, its weight can be reduced to only about 4.75 pounds by replacing the cylindrical outer steel bushing member 21 with a composite material; and, by approximately an additional pound if the inner cylindrical bushing member 22 is replaced with a composite material. This represents a further reduction in the weight of heavy duty truck suspensions of from 9 pounds to 13 pounds having in mind that each truck suspension normally includes four (4) walking beam end bushings.

Finally, as a best shown by reference to FIG. 10, while a typical all steel torque arm bushing 44 weighs approximately 4 pounds, that weight can be reduced to about 3 pounds by the use of a composite outer bushing member 45 formed of filament wound glass fibers and an epoxy resin. An additional weight saving of approximately another pound can be achieved by replacing the inner steel pin or rod 46 (which commonly weighs close to 3 pounds) with a composite bushing formed of either filament wound glass fibers and an epoxy resin or compression molded using a composite material of glass fiber filaments embedded in an epoxy resin. In short, the foregoing represents a reduction of about one pound per torque arm bushing 44 if only the outer bushing member 45 is made of composite material; and, a reduction of about two pounds per torque arm bushing 44 if both the outer and inner steel members 45, 46 are replaced with a composite material. Since a typical heavy duty truck suspension will employ from four (4) to ten (10) torque arm bushings 44, a potential weight reduction achievable by the use of composite materials is from about 10 pounds to about 20 pounds.

Thus, it will be appreciated that by the selective use of composite light weight materials—materials which are, in effect, at least as strong and long lasting as steel—the weight reduction in bushings alone can range from about 51 pounds to about 65 pounds, thus permitting a corresponding increase of from about 51 pounds to about 65 pounds in load carrying capacity for every trip made by the truck. Moreover, because the bushings are formed of urethane and a composite glass fiber/epoxy resin material, the risk of rust, corrosion and similar damage common to all steel bushings is eliminated.

I claim:

1. In a bushing of the type having: i) a first outer cylindrical bushing member; ii) a second inner bushing member coaxial with and spaced from said first bushing member and defining an annular space therebetween; and iii), an elastomeric annular interface in said annular space and in face-to-face contact with the inner surface of said first bushing member and the outer surface of said second bushing member, the improvement comprising:

a) first and second groove defining means formed in one of the inner surface of said first outer cylindrical bushing member and the outer surface of said second inner bushing member;

b) said first and second groove defining means each lying, at least in substantial part, in planes transverse to the axis of said bushing other than a transverse plane normal to said axis;

c) at least a portion of said first groove defining means being axially spaced from a corresponding portion of said second groove defining means on one side of the one of said first and second bushing members in which said groove defining means are formed by an axial distance that is greater than the axial distance between corresponding portions of said first and second groove defining means on the diametrically opposite side of the one of said first and second bushing members in which said groove defining means are formed; and, d) said elastomeric annular interface extending into and substantially filling said first and second groove defining means;

whereby, said annular elastomeric interface is mechanically locked to the one of said first and second bushing members in which said groove defining means are formed with relative rotational movement and relative axial movement between said elastomeric interface and the one of said first and second bushing members to which it is mechanically locked being permanently precluded while said annular elastomeric interface is free to rotate relative to the other of said first and second bushing members.

2. In a bushing of the type having: i) a first outer cylindrical bushing member; ii) a second inner bushing member coaxial with and spaced from said first bushing member and defining an annular space therebetween; and iii), an elastomeric annular interface in said annular space and in face-to-face contact with the inner surface of said first bushing member and the outer surface of said second bushing member, the improvement comprising:

a) first and second groove defining means formed in the inner surface of said first outer cylindrical bushing member;

b) said first and second groove defining means each lying, at least in substantial part, in planes transverse to the axis of said bushing other than a transverse plane normal to said axis;

c) at least a portion of said first groove defining means being axially spaced from a corresponding portion of said second groove defining means on one side of said first outer cylindrical bushing member by an axial distance that is greater than the axial distance between corresponding portions of said first and second groove defining means on the diametrically opposite side of the said first outer cylindrical bushing member; and, d) said elastomeric annular interface extending into and substantially filling said first and second groove defining means;

whereby, said annular elastomeric interface is mechanically locked to said first outer cylindrical bushing member with relative rotational movement and relative axial movement between said elastomeric interface and said first outer cylindrical bushing member to which it is mechanically locked being permanently precluded while said elastomeric interface is free to rotate relative to said second inner bushing member.

3. A bushing as set forth in claim 1 wherein a ball is formed centrally in one of said annular elastomeric interface and the other of said first and second bushing members and a complemental generally spherical socket is formed in the other one of said annular elastomeric interface and the other of said first and second bushing members so as to define a ball and socket joint between said annular elastomeric interface and the other of said first and second bushing members;

whereby, said annular elastomeric interface is mechanically locked to the one of said first and second bushing members in which said groove defining means are formed with relative rotational movement and relative axial movement between said elastomeric interface and the one of said first and second bushing members to which it is mechanically locked being permanently precluded while said annular elastomeric interface is free to rotate relative to the other of said first and second bushing members, yet is precluded from relative axial movement with respect to the other of said first and second bushing members by said ball and socket joint.

4. A bushing as set forth in claim 2 wherein a ball is formed centrally on said second inner bushing member and a complemental generally spherical socket is formed on the inner surface of said annular elastomeric interface so as to define a ball and socket joint between said annular elastomeric interface and said second inner bushing member;

whereby, said annular elastomeric interface is mechanically locked to said first outer cylindrical bushing member with relative rotational movement and relative axial movement between said elastomeric interface and said first outer cylindrical bushing member to which it is mechanically locked being permanently precluded while said elastomeric interface is free to rotate relative to said second inner bushing member, yet is precluded from relative axial movement with respect to said second inner bushing member by said ball and socket joint.

5. A bushing as set forth in claims 1, 2, 3 or 4 wherein said first and second bushing members are formed of metal.

6. A bushing as set forth in claims 1, 2, 3 or 4 wherein said first bushing member is formed of a composite material including filament wound glass fibers and an epoxy resin, and said second bushing member is formed of metal.

7. A bushing as set forth in claims 1, 2, 3 or 4 wherein said first and second bushing members are formed of a composite material including filament wound glass fibers and an epoxy resin.

8. A bushing as set forth in claims 1, 2, 3 or 4 wherein said first bushing member is formed of one of a metal and a composite material including filament wound glass fibers and an epoxy resin and said second bushing member is formed of a compression molded composite material including glass fibers embedded in an epoxy resin.

9. A bushing as set forth in claims 1, 2, 3 or 4 wherein said first and second groove defining means comprise helical threads.

10. A bushing as set forth in claim 9 wherein said first groove defining means comprises a right hand thread and said second groove defining means comprises a left hand thread.

11. A bushing as set forth in claim 9 wherein the pitch of said first groove defining helical thread is different than the pitch of said second groove defining helical thread.

12. A bushing as set forth in claims 1, 2, 3 or 4 wherein each of said first and second groove defining means comprises a plurality of discrete spaced grooves.

13. A bushing as set forth in claim 12 wherein each of said discrete spaced grooves is a continuous endless groove.

14. A bushing as set forth in claims 1, 2, 3 or 4 wherein said first groove defining means extends from one axial end of said bushing and terminates short of the midpoint of said bushing, and said second groove defining means extends from the opposite axial end of said bushing and terminates short of the midpoint of said bushing.

15. A bushing as set forth in claims 1, 2, 3 or 4 wherein said elastomeric interface is urethane.

16. A bushing as set forth in claims 1, 2, 3 or 4 comprising a walking beam bushing wherein said second bushing member is cylindrical in configuration.

17. A walking beam bushing as set forth in claim 16 wherein said first bushing member is formed of filament wound glass fibers and an epoxy resin.

18. A walking beam bushing as set forth in claim 17 wherein said second bushing member is formed of filament wound glass fibers and an epoxy resin.

19. A bushing as set forth in claims 1, 2, 3 or 4 comprising a torque arm bushing wherein said second bushing member is solid having a central rounded cross-sectional configuration and at least one axially projecting end portion having parallel opposed flatted sides with a hole extending therethrough.

20. A torque arm bushing as set forth in claim 19 wherein said first bushing member is formed of filament wound glass fibers and an epoxy resin.

21. A torque arm bushing as set forth in claim 19 wherein said second bushing member is formed of filament wound glass fibers and an epoxy resin.

22. A torque arm bushing as set forth in claim 20 wherein said second bushing member is formed of a compression molded composite material including glass fibers embedded in an epoxy resin.

23. A bushing comprising, in combination:

a) a first outer cylindrical bushing member formed of filament wound glass fibers and an epoxy resin;

b) a second inner bushing member formed of a composite material including glass fibers and an epoxy resin, said second inner bushing member being coaxial with and spaced from said outer cylindrical bushing member and defining an annular space therebetween;

c) a pre-loaded elastomeric annular interface in said annular space and in face-to-face contact with the inner surface of said first bushing member and the outer surface of said second bushing member;

d) first and second groove defining means formed in the inner surface of said first cylindrical bushing member wherein at least a portion of said first groove defining means is axially spaced from a corresponding portion of said second groove defining means on one side of said first bushing member by an axial distance that is greater than the axial distance between corresponding portions of said first and second groove defining means on the diametrically opposite side of said first bushing member; and, e) means for preventing relative axial movement between said elastomeric interface and said second bushing member while permitting relative rotational movement therebetween.

24. A bushing as set forth in claim 23 wherein said second bushing member is cylindrical and is formed of filament wound glass fibers and an epoxy resin.

25. A bushing as set forth in claim 23 wherein said second bushing member is solid having a central rounded cross-sectional configuration and at least one axially projecting end portion having parallel opposed flatted sides with a hole extending therethrough.

26. A bushing as set forth in claim 25 wherein said second bushing member is formed of filament wound glass fibers and an epoxy resin.

27. A bushing as set forth in claim 25 wherein said second bushing member is formed of a compression molded composite material including glass fibers embedded in an epoxy resin.

28. A bushing as set forth in claim 23 wherein said elastomeric interface is urethane.

29. A bushing as set forth in claims 23, 24, 25, 26, 27 or 28 wherein said first and second groove defining means comprise helical threads.

30. A bushing as set forth in claim 29 wherein said first groove defining means comprises a right hand thread and said second groove defining means comprises a left hand thread.

31. A bushing as set forth in claim 30 wherein the pitch of said first groove defining helical thread is different than the pitch of said second groove defining helical thread.

32. A bushing as set forth in claims 23, 24, 25, 26, 27 or 28 wherein each of said first and second groove defining means comprises a plurality of discrete spaced grooves.

33. A bushing as set forth in claim 32 wherein each of said discrete spaced grooves is a continuous endless groove.

34. A bushing as set forth in claims 23, 24, 25, 26, 27 or 28 wherein said elastomeric interface has a spherical socket formed centrally thereof and said second bushing member has a complemental spherical ball formed centrally thereof with said ball and said socket defining a ball and socket joint precluding relative axial movement between: i) said second bushing member; and ii), said first bushing member and said elastomeric interface while permitting relative rotational movement therebetween.

* * * * *